No. 784,036. PATENTED MAR. 7, 1905.
J. CRAIG.
HAY RAKE AND STACKER.
APPLICATION FILED MAY 11, 1904.
2 SHEETS—SHEET 2.
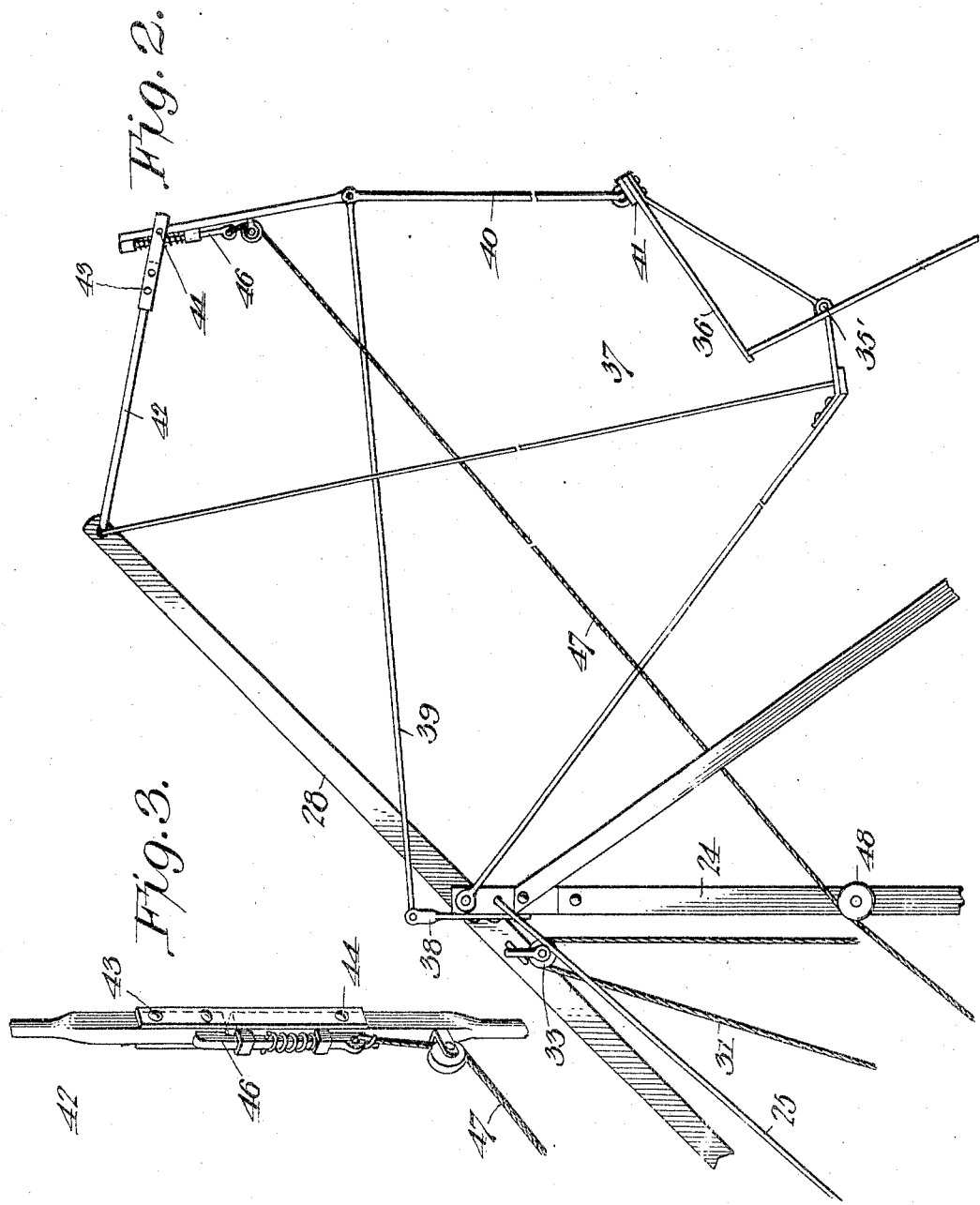
Witnesses
E. J. Stewart
W. H. Clarke
James Craig, Inventor.
by C. A. Snow & Co.
Attorneys No. 784,036. Patented March 7, 1905.

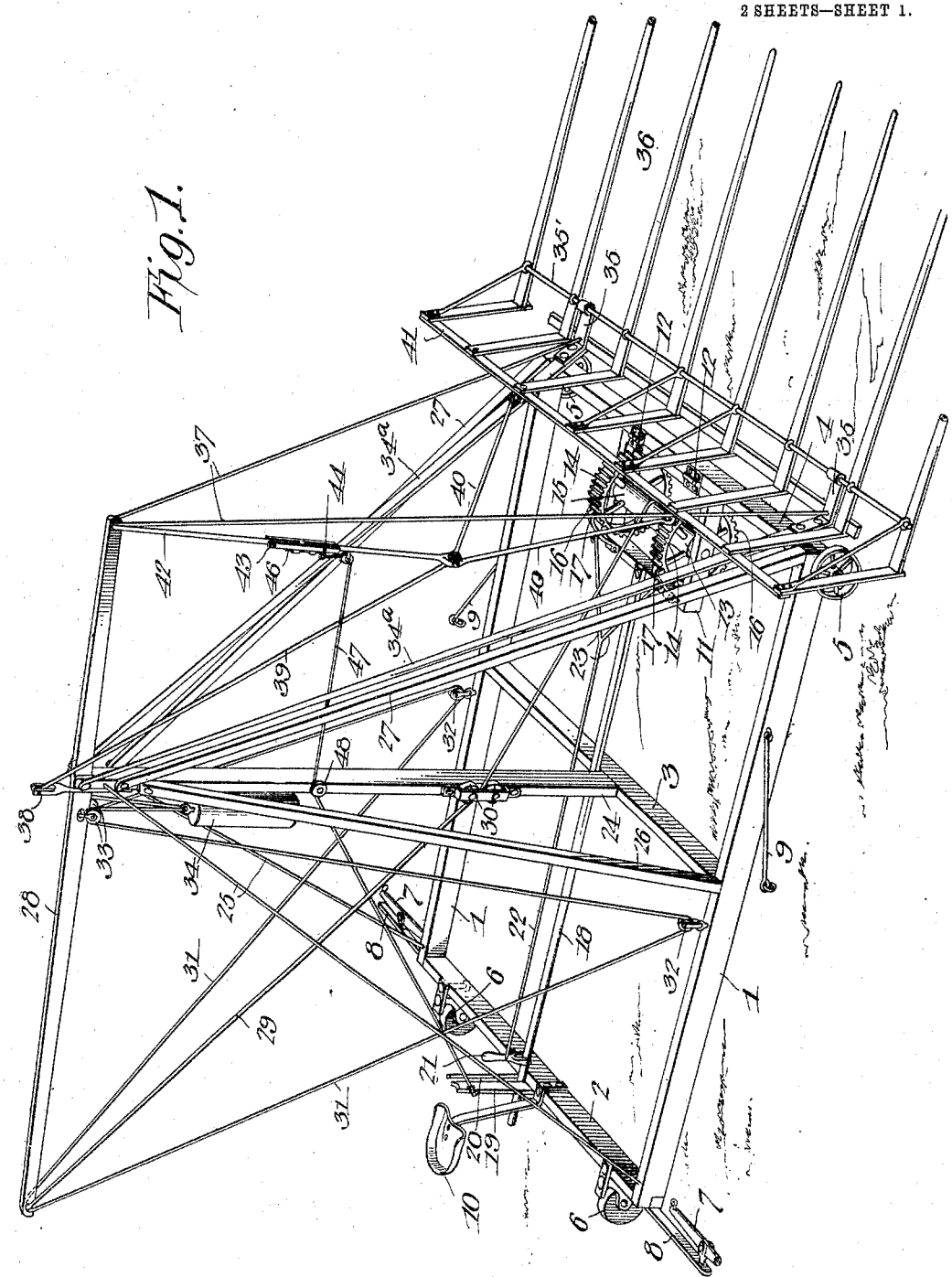

UNITED STATES PATENT OFFICE.

JAMES CRAIG, OF GARDEN CITY, KANSAS.

HAY RAKE AND STACKER.

SPECIFICATION forming part of Letters Patent No. 784,036, dated March 7, 1905.

Application filed May 11, 1904. Serial No. 207,475.

*To all whom it may concern:*

Be it known that I, JAMES CRAIG, a citizen of the United States, residing at Garden City, in the county of Finney and State of Kansas, have invented a new and useful Hay Rake and Stacker, of which the following is a specification.

This invention relates to stacking or loading machines.

The object of the invention is mechanically to gather hay, straw, or the like in harvest time, convey it to the vicinity of a stack or wagon, and deposit it thereon. This object is accomplished by means of the herein-described machine, which is simple, durable, and inexpensive in construction and rapid and efficient in operation.

In order that the invention may be clearly understood it will be described in detail with reference to the accompanying drawings, wherein—

Figure 1 is a perspective view of a machine constructed in accordance with the invention. Fig. 2 is a similar view showing the means for dumping the load. Fig. 3 is a detail view of the latch controlling the break-joint.

The ground-frame of the machine consists of the side pieces 1 1 and the cross-pieces 2, 3, and 4. At the forward end of the frame are mounted on a stationary axle the supporting-wheels 5 5, and at the rear end of the frame are pivotally mounted the guide-wheels 6 6. The whiffletrees 7 7 are connected to rods 8 8 at the rear end of the frame. A back rod 9 is attached to each side piece 1 to permit the horses drawing the machine to hold back when necessary. Fastened to the rear cross-piece 2 of the frame is the seat 10 for the operator of the machine.

A small rectangular frame 11 is pivotally connected or hinged at 12 12 to the front cross-piece 4 of the machine-frame. Journaled transversely in the small frame 11 is an axle 13, upon which are rigidly mounted two power-wheels 14 14 and a drum 15, the drum 15 being preferably arranged between the power-wheels 14. Upon the tread-surface or periphery of each power-wheel 14 is arranged a series of lugs or projections 16. The func- tion of these lugs 16 is twofold, in that they serve not only to take a firm hold on the ground when the power-wheels are lowered in contact therewith, but also as ratchet members for pawls 17, which are pivoted to the rear end of the small frame 11, as shown. Extending rearwardly from the frame 11 and terminating adjacent to the seat of the operator is a lever 18, by means of which the frame 11 may be raised or lowered to bring the power-wheels 14 14 into or out of contact with the ground, for a purpose hereinafter to be described. Adjacent to the rear end of the lever 18 is an upright 19, connected to the cross-piece 2 of the machine-frame. The lever 18 works in a vertical guideway 20 of the upright 19, and when said lever has been raised to its highest position to lift the power-wheels 14 out of contact with the ground it may be rested upon the upper end of the upright 19 to hold the power-wheels in their raised position. Pivoted at the rear end of the lever 18 is a hand-lever 21, to which is connected a rod 22, that extends forward along the upper surface of the lever 18. At its forward end the rod 22 forks to form the small rods 23 23, each of which is connected to one of the pawls 17. By means of the hand-lever 21 and rods 22 23 the pawls 17 may be thrown into and out of contact with the peripheries of the power-wheels 14 at the will of the operator to prevent retrograde movement thereof.

Supported at its lower end upon the cross-piece 3 of the machine-frame is an upright or mast 24, which is braced at the rear by the rods 25, at the sides by the braces 26, and at the front by the braces 27, extending down to the ground-frame of the machine.

Pivotally mounted in the upper end of the mast 24 is a hoisting-beam 28. To the rear end of the hoisting-beam 28 is connected a rope or cable 29, which extends down between pulleys 30 30 on the mast 24 and around the drum 15. When the power-wheels 14 are lowered into contact with the ground and the drum 15 rotated thereby, the rear end of the hoisting-beam is drawn down, as will be understood.

In order to counterbalance the weight of the hoisting-beam 28, ropes 31 are attached to the rear end thereof. These ropes 31 pass down through pulleys 32 on the side pieces of the machine-frame, up through pulleys 33 on the hoisting-beam, and are then connected to counterweights 34, which, if desired, may be empty receptacles adapted to be filled to the proper weight with dirt or other material. By placing the pulleys 33 on the hoisting-beam to the rear of its fulcrum-point a double pull or counterbalancing influence is exerted thereon.

Hoisting-arms $34^a$ are pivoted to the upper end of the mast 24 on a line with the fulcrum of the hoisting-beam 28. Secured to the lower end of each hoisting-arm $34^a$ is an angle-iron 35, in the forward end of which is journaled a cross-rod 35', which forms part of the load-gathering frame 36, which is of any preferred construction.

Extending down from the forward end of the hoisting-beam 28 are the hoisting-rods 37, which are connected at their lower ends to the angle-irons 35, as shown. The lower ends of the hoisting-arms $34^a$ rest against the forward end of the machine-frame in the manner illustrated when the gathering-frame is lowered to collect hay, straw, or the like preparatory to stacking.

The dumping of the material carried by the gathering-frame is effected through the following mechanism. An upright bracket-arm 38 is attached to the top of the mast 24 on one side of the hoisting-beam. Hinged to the bracket-arm 38 is a rod 39. To the lower end of the rod 39 are pivoted two rods 40 40 each of which is connected to the rear cross-piece of the gathering-frame 36.

Pivoted to the forward end of the hoisting-beam 28 is a rod 42, which is connected at its lower end to the lower end of the rod 39 at the point where said rod is joined by the rods 40 40. The rod 42 is divided into two sections, which are hinged together at the points 44 by means of links 43 to form a break-joint, which is adapted to be broken or bent, like an elbow-joint, by means of a trip 46, operated by a rope 47, passing through a pulley 48 on the mast 24 and terminating adjacent to the operator's seat, so that it may be pulled by him to dump the load. The operation of this part of the device is as follows: When the gathering-frame 36 is near the ground in readiness to gather hay or straw, the horizontal position which it assumes causes the hinge or break joint in the rod 42 to become straight. Then when the gathering-frame is raised through the power-wheels 14 and hoisting-beams the direct pressure exerted on the rods 42, 39, and 40 causes the rod 42 to remain straight until the rope 47 is pulled by the operator to break the joint therein, and consequently by taking the direct pressure off the rods 39 and 40 to permit the dumping of the load off the gathering-frame.

It is thought the operation of the entire device will be understood from the foregoing description. When the gathering-frame becomes full, the lever 18 is lowered to place, with the power-wheels in contact with the ground, and the hand-lever 21 is operated to throw the pawls 17 into engagement with the power-wheels to prevent any retrogressive movement thereof. As the machine advances the rope 30 winds on the drum 15, and the gathering-frame is raised to the desired height. The load is then conveyed to the wagon or stack and dumped thereon at the proper time by pulling the rope 47. When it is desired to lower the gathering-frame, the hand-lever 21 is operated to disengage the pawls 17 from the power-wheels, and the hoisting-beam descends by its own weight, the counterbalance 34 serving to make this descent gradual and easy, and the power-wheels being used as brakes, if necessary.

Changes in the details of construction and arrangement of parts may be made within the scope of the following claims without departing from the spirit of my invention.

Having thus described the invention, what is claimed is—

1. A wheel-supported frame, a mast rising from the same, a tilting beam supported by the mast, braces pivoted in axial alinement with the fulcrum of the beam, a gathering member supported by said braces, connections between the gathering member and the front end of the beam and means for tilting the beam.

2. A wheel-supported frame, a mast rising from the same, a tilting beam supported by the mast, braces connected pivotally with the mast, a gathering member connected hingedly with the braces, connecting means between the gathering member and the beam, and means for tilting the beam.

3. A wheel-supported frame, a mast rising from the same, a tilting beam supported by the mast, braces connected pivotally with the mast, a rod supported by said braces, a gathering member mounted tiltingly upon said rod, connecting means between the gathering member and beam, and means for tilting the beam.

4. A wheel-supported frame, a tilting beam supported above said frame, braces mounted pivotally in axial alinement with the fulcrum of the tilting beam, a gathering member connected tiltingly with said braces, connecting-rods extending from the supports of the gathering member to the beam, means for tilting the beam, and means for supporting the gathering member against tilting.

5. A wheel-supported frame, a tilting beam supported above said frame, braces mounted pivotally in axial alinement with the fulcrum of the tilting beam, a rod supported by said braces, a gathering member pivoted upon said rod, connecting-rods extending from the supports of the gathering member to the tilting beam, link-rods connecting an upright portion of the gathering member with a fixed supporting-point, and a rod having a break-joint connecting said link-rods with the tilting beam.

6. A wheel-supported traveling frame, a tilting beam supported above said frame, a pivotally-mounted gathering member, pivotal braces supporting the same, connecting means between said braces and the tilting beam, link-rods connecting an upright portion of the gathering member with a fixed supporting-point, a jointed rod connecting the joint of said link-rods with the tilting beam, and spring-actuated means for maintaining the jointed rod in extended position.

7. A wheel-supported frame, a tilting beam supported above said frame, a gathering member connected with the beam, and means for tilting the beam including a flexible element connected therewith, a winding-drum for the flexible element, a swinging frame supporting said winding-drum, toothed earth-engaging members connected with the drum, and stop means adapted to engage said toothed members.

8. A wheel-supported traveling frame, a mast rising from the same, a tilting beam supported by the mast, a gathering member supported by the tilting beam, means for effecting the tilting of the beam by the passage of the frame over the ground including a flexible element and a winding-drum having earth-engaging members, and a counterbalance including a flexible element connected with the rear end of the beam, guide-pulleys upon the sills of the frame, guide-pulleys upon the beam in rear of its fulcrum, and a counterweight.

In testimony that I claim the foregoing as my own I have hereto affixed my signature in the presence of two witnesses.

JAMES CRAIG.

Witnesses:
 B. F. SIMONDS,
 OLIVIA C. LEMERT.